Patented Jan. 18, 1949

2,459,149

UNITED STATES PATENT OFFICE 2,459,149

ANTHRAQUINONE COMPOUNDS

Harry W. Coover, Joseph B. Dickey, and Edmund B. Towne, Rochester, N. Y., assignors to Eastman Kodak Company, Rochester, N. Y., a corporation of New Jersey No Drawing. Application June 1, 1945, Serial No. 597,162

2 Claims. (Cl. 260—380)

This invention relates to anthraquinone compounds useful for the coloration of textile materials containing cellulose carboxylic ester rayon, and to a process for the preparation of such dyes.

The anthraquinone compound having the formula:

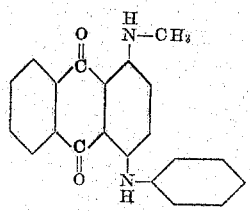

has long been known. This compound, however, is of little value as a dye for textile materials containing cellulose carboxylic ester rayon, because it colors such textile materials very poorly from an aqueous suspension of the compound. Similarly, the anthraquinone compounds having the following general formula:

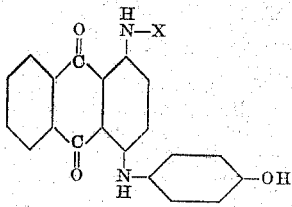

X=alkyl or hydroxyalkyl such as methyl, ethyl, $\beta$-hydroxyethyl, etc.

are of little value as dyes for cellulose carboxlic ester rayon textile material because they color such textile materials poorly from their aqueous suspensions. Further, the dyeings obtained, in general, are not as light fast as those obtained using 1-methyl-amino-4-phenylamino anthraquinone.

Another known anthraquinone compound, 1-amino-4-p-(hydroxyphenyl)-amino anthraquinone having the formula:

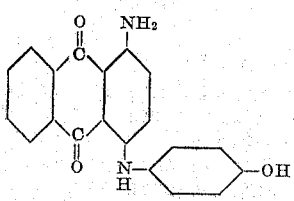

is of little value for coloring cellulose carboxylic ester rayon textile materials because it colors such materials poorly from an aqueous suspension of the compounds.

The known compound, 1,4-di(p-tolyl)amino anthraquinone, having the formula:

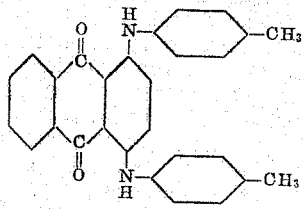

possesses so little affinity for celulose carboxylic ester rayon textile materials that it is unquestionably not a dye for such materials.

Still another known compound having the formula:

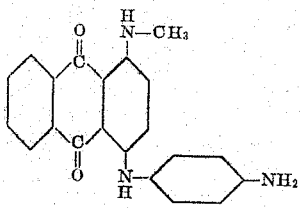

dyes cellulose carboxylic ester textile materials fairly well, but the dyed textile materials leave much to be desired with respect to resistance to gas-fading and fastness to light. The dyeings obtained with this dye compound are about half as fast to light and about half as resistant to gas-fading as are the dyeings obtained with our new dye compounds.

Other anthraquinone compounds having the following general formula:

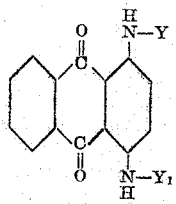

wherein Y and $Y_1$ each represents methyl, ethyl, propyl, butyl, $\beta$-hydroxyethyl, $\beta$-hydroxypropyl or $\beta,\gamma$-dihydroxypropyl, for example, color cellulose acetate very readily but again the dyed materials leave much to be desired with respect to resistance to gas-fading and fastness to light. The dyeings obtained with our new dye compounds on cellulose carboxylic ester rayon textile materials are approximately 200–300% faster to light and approximately 100% better with respect to gas-fading than the dyeings obtained on these materials with the dye compounds just mentioned.

The anthraquinone compounds, which we believe are new compounds, having the following general formula:

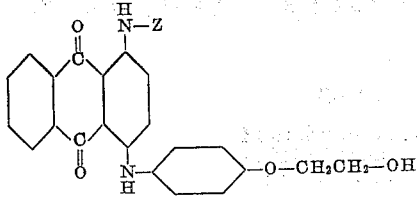

wherein Z represents an alkyl group such as methyl, ethyl, propyl or butyl, an alkoxyalkyl group such as β-methoxyethyl or β-ethoxy-ethyl or a hydroxyalkyl group such as β-hydroxyethyl, β-hydroxy-propyl, γ-hydroxypropyl or β,γ-dihydroxypropyl possess some affinity for cellulose carboxylic ester rayon textile materials. The greenish-blue dyeings obtained with these compounds possess good resistance to gas-fading as well as good fastness to light. Their affinity for cellulose carboxylic textile materials, however, is not nearly as good as that of the new anthraquinone compounds of our invention.

We have now found new anthraquinone compounds which not only dye cellulose carboxylic ester rayon textile materials readily to full shades, but the dyed textiles are much more resistant to gas-fading than are textiles colored with the aforesaid prior compounds, and are also as light-fast, or faster, than are the textiles dyed with the aforesaid prior compounds. Our new anthraquinone compounds color cellulose carboxylic ester rayon textile materials greenish-blue shades which are of considerable industrial value. They are of particular value for the coloration of cellulose acetate rayon textile materials. It is, accordingly, an object of our invention to provide new anthraquinone dye compounds and to provide a process for preparing such dye compounds. Other objects will become apparent hereinafter.

Our new anthraquinone compounds can be represented by the following general formula:

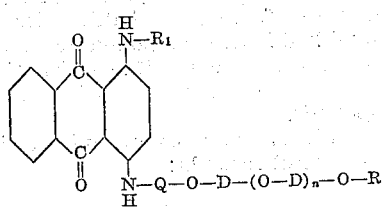

wherein $n$ represents a whole positive integer of from 1 to 2, D represents an ethylene group, a trimethylene group or a propylene group, Q represents a phenylene group (e. g. o-phenylene and p-phenylene groups) which may carry substituents, such as halogen, an acetamino group, a methyl group, a hydroxyl group, an alkoxy group, a trifluoromethyl group, etc., R represents a member selected from the group consisting of hydrogen and an alkyl group containing from 1 to 2 carbon atoms and $R_1$ represents a member selected from the group consisting of a low carbon alkyl group, a low carbon alkoxyalkyl group and a low carbon hydroxyalkyl group. Dye compounds wherein $n$ is 2 have been found to be particularly advantageous.

The new anthraquinone compounds of our invention can be prepared by condensing an anthraquinone compound of the following general formula:

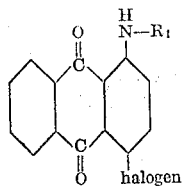
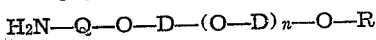

wherein $R_1$ represents a low carbon alkyl group, a low carbon alkoxyalkyl group or a low carbon hydroxyalkyl group with an amino compound of the following general formula:

$$H_2N-Q-O-D-(O-D)_n-O-R$$

wherein $n$ represents a whole positive integer of from 1 to 2, Q represents a phenylene group which may carry substituents such as halogen, an acetamino group, a methyl group, a hydroxyl group, an alkoxy group, a trifluoromethyl group, etc., D represents an ethylene group, a trimethylene group or a propylene group and R represents a member selected from the group consisting of hydrogen and an alkyl group containing from 1 to 2 carbon atoms.

The condensation reaction just mentioned is advantageously carried out in the presence of the ammonium salt of a low carbon aliphatic fatty acid. The use of ammonium acetate is preferred. Ammonium acetate or its aqueous solutions can be used as such, but we have found a stock solution of acetic acid, water and ammonia, the ammonia and acetic acid being present in equal molecular proportions, to be a most convenient form in which to apply the ammonium acetate. The ammonium salts of other low carbon aliphatic fatty acids may be similarly conveniently employed, e. g., a stock solution of propionic acid, water and ammonia, the ammonia and propionic acid being present in equal molecular proportions, can be used. The function, for example, of ammonium acetate is not known to us but we have found its presence definitely beneficial. The term "ammonium salt of a low carbon aliphatic fatty acid" as used herein and in the claims refers not only to the salts but also to solutions containing both a "low carbon aliphatic acid" and ammonia.

Similarly, the condensation reaction is advantageously carried out in the presence of a copper catalyst. Cupric acetate and cupric sulfate have been found to aid in the reaction. Of these the use of cupric acetate is preferred.

Our new anthraquinone compounds can also be prepared by reacting the leuco derivatives of the anthraquinone compounds of the following general formula:

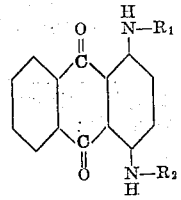

wherein $R_1$ and $R_2$ each represents a member selected from the group consisting of a low carbon alkyl group, a low carbon alkoxyalkyl group and a low carbon hydroxyalkyl group with at least one mole equivalent of an amino compound of the formula:

$$H_2N-Q-O-D-(O-D)_n-O-R$$

wherein $n$, D, Q and R have the meaning assigned to them to replace one of the aliphatic amino groups attached to the anthraquinone nucleus. Normally an excess of the amino compound above referred to is used.

The condensation reaction referred to in the preceding paragraph can be carried out either with or without an acid-condensing agent, e. g., boric acid, phosphoric acid, sulfuric acid, hydrochloric acid, stannous chloride, stannic chloride, etc. The condensation reaction is also advantageously, but not necessarily, carried out in a medium or diluent which is inert with respect to the condensation. Alcohols, especially alcohols of the formula: $C_nH_{2n+1}OH$ wherein $n$ represents a positive integer of from 2 to 5 are advantageously employed as the diluent. Tetrahydrofurfuryl alcohol or pyridine can be employed as the diluent. Heat accelerates the condensation.

Following the condensation, the leuco compound is oxidized in any of the known manners of oxidizing leuco compounds, e. g., by passing air through the reaction medium or preferably by means of an oxidizing agent, such as sodium perborate.

The following examples illustrate our new anthraquinone compounds and the manner of obtaining the same.

*Example 1.—1-methylamino-4-<p-{β-[β-(β - hydroxyethoxy) - ethoxy] - ethoxy} - anilino>-anthraquinone*

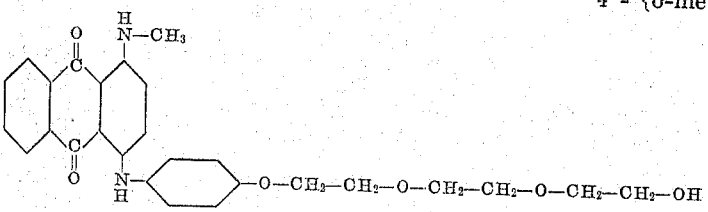

3 grams of 1-methylamino-4-bromoanthraquinone, 10 grams of p-{β-[β-(β-hydroxyethoxy)-ethoxy]-ethoxy}-aniline, 0.1 gram of cupric acetate and 20 cc. of a stock solution containing 100 cc. of glacial acetic acid, 400 cc. of water and 110 cc. of 28% aqueous ammonia were placed together in a suitable reaction vessel. The reaction mixture was slowly heated to boiling with vigorous stirring and boiling and vigorous stirring were maintained until no further color change took place. When cool the reaction mixture was filtered and the dye of the above formula was obtained as an insoluble product. It was washed with cold dilute 2–3% hydrochloric acid. Upon crystallization from butanol the dye melted at 130° C. It colors cellulose acetate greenish-blue shades from its aqueous suspensions.

In a similar manner, 1-methylamino-4-<o-{β-[β-(β-hydroxyethoxy) - ethoxy] - ethoxy}- anilino>anthraquinone, 1-methylamino - 4 - {p-[β-(β-hydroxyethoxy) - ethoxy] - anilino} - anthraquinone, 1-methylamino - 4 - {o-chloro-p-[β-(β-hydroxyethoxy) - ethoxy] - anilino} - anthraquinone, 1 - methylamino-4-{p-[γ - (γ-hydroxypropoxy) - propoxy] - anilino} - anthraquinone, 1 - methylamino - 4-{p-[β-(β-hydroxypropoxy)-propoxy]-anilino}-anthraquinone, 1 - methylamino-4 - {p - acetamino - o - [β - (β - hydroxyethoxy)-ethoxy] - anilino} - anthraquinone, 1 - methylamino-4-{p-[β-(β-ethoxyethoxy)-ethoxy] - anilino}-anthraquinone and 1 - methylamino-4-{p-[β - (β - methoxy-ethoxy)-ethoxy]-anilino}-anthraquinone can be prepared.

*Example 2.—1-ethylamino-4-<p - {β-[β-(β - hydroxyethoxy)-ethoxy]-ethoxy} - anilino>-anthraquinone*

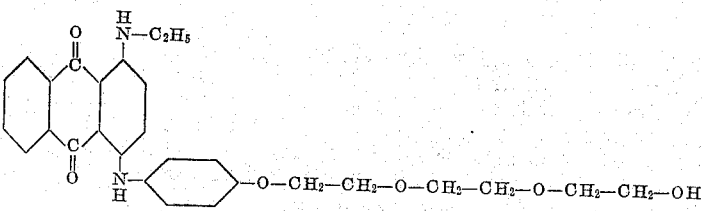

9 grams of 1-ethylamino-4-bromoanthraquinone, 30 grams of p-{β-[β-(β-hydroxyethoxy)-ethoxy]-ethoxy}-aniline, 0.3 gram of cupric acetate and 60 cc. of a stock solution containing 100 cc. of glacial acetic acid, 400 cc. of water and 110 cc. of 28% aqueous ammonia are placed together in a suitable reaction vessel and the reaction mixture is slowly heated to boiling with vigorous stirring and boiling and vigorous stirring are maintained until no further color change takes place. When cool the reaction mixture is filtered to obtain the dye of the above formula as an insoluble product. The dye is washed with cold dilute 2–3% hydrochloric acid and then with water. It colors cellulose acetate greenish-blue shades.

In a similar manner 1-ethylamino-4-{o-hydroxy - p -{β- [β-(β - hydroxyethoxy) - ethoxy]-ethoxy}-anilino>-anthraquinone, 1-ethylamino-4 - {o-methyl-p-[β-(β-hydroxyethoxy)-ethoxy]-anilino}-anthraquinone, 1 - ethylamino-4-{p-[β-(β-ethoxyethoxy)-ethoxy] - anilino}-anthraquinone, 1-ethylamino-4-{o-[β-(β- hydroxyethoxy)-ethoxy]-anilino}-anthraquinone, 1 - ethylamino-4-{o-chloro-p-[β-(β-hydroxypropoxy)-propoxy]-anilino}-anthraquinone and 1-ethylamino-4-{p-[γ-(γ-hydroxypropoxy)-propoxy] - anilino} - anthraquinone can be prepared. As previously indicated all these compounds color cellulose carboxylic ester rayon textile materials greenish-blue from their aqueous suspensions.

Similarly by substituting 1-β-methoxyethylamino - 4-bromoanthraquinone, 1-isopropylamino-4-bromoanthraquinone 1-β,γ - dihydroxypropylamino-4-bromoanthraquinone and 1-n-butylamino-4-bromoanthraquinone for the 1-methylamino-4-bromoanthraquinone of Example 1, 1-β-methoxyethylamino-4-<p-{β-[β - (β - hydroxyethoxy)-ethoxy]-ethoxy} - anilino> - anthraquinone, 1-isopropylamino-4-<p-{β-[β-(β-hydroxyethoxy)-ethoxy]-ethoxy} - anilino> - anthraquinone, 1-β,γ-dihydroxypropylamino-4-<p-{β-[β-(β-hydroxyethoxy)-ethoxy]-ethoxy} - anilino>-anthraquinone and 1-n-butylamino-4-<p-{β-[β-(β-hydroxyethoxy)-ethoxy] - ethoxy} - anilino>-anthraquinone, respectively, can be prepared.

*Example 3.—1-β-methoxyethylamino-4-<p-{β-[β-(β-hydroxyethoxy) - ethoxy]-ethoxy}-anilino>-anthraquinone*

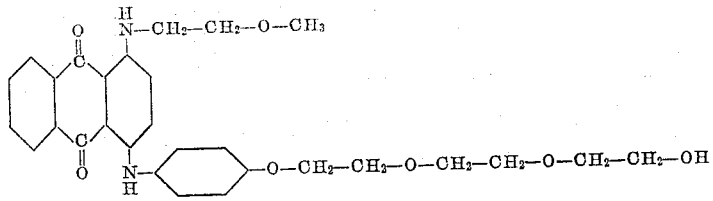

12 grams of leuco quinizarin and 200 cc. of butanol are put in a suitable reaction vessel and heated together to refluxing conditions with vigorous stirring. 7.5 grams of β-methoxyethylamine in 50 cc. of butanol are then added dropwise over a period of 1 hour, following which 6 grams of boric acid are added. Then 12 grams of p-{β-[β-(β-hydroxyethoxy)-ethoxy]-ethoxy}-aniline in 50 cc. of butanol are added to the reaction mixture and the refluxing is continued, with stirring, for about 10 hours. The resulting leuco dye compound is oxidized by adding an aqueous solution of sodium perborate to the hot reaction mixture. After cooling the reaction mixture is poured into water to precipitate the dye which is recovered by filtration, washed with water and dried. If desired the dye may be purified by one or more crystallizations from a solvent, especially where a dye compound of high purity is desired. Where more than one crystallization is used the second crystallization, can, of course, be effected from a different solvent than that used in the first crystallization. Upon purification by recrystallization from butanol the dye compound melts at 127°–130° C. It colors cellulose acetate greenish-blue shades.

Boric acid can be omitted from the condensation reaction of Example 3 with little change in the results obtained.

1-β-methoxyethylamino-4-<p-{β-[β - (β - hydroxyethoxy)-ethoxy] - ethoxy} - anilino> - anthraquinone can also be prepared in accordance with the method described in Example 1 or 2 by condensing 1 - β-methoxyethylamino-4-bromoanthraquinone with p-{β-[β-(β-hydroxyethoxy)-ethoxy]-ethoxy}-aniline.

*Example 4.—1-ethylamino-4-<p-{β-[β - (β - hydroxyethoxy)-ethoxy]-ethoxy}- anilino> - anthraquinone*

13.35 grams of 1-ethylamino-4-hydroxyanthraquinone, 30 grams of p-{β-[β-(β-hydroxyethoxy)-ethoxy]-ethoxy}-aniline and 6 grams of boric acid are refluxed together in pyridine until no further color change takes place, ordinarily 15–20 hours. Upon cooling the reaction mixture is filtered to obtain the dye as an insoluble product. The dye is washed with an aqueous 2% hydrochloric acid solution to remove unreacted p-{β-[β-(β-hydroxyethoxy) - ethoxy] - ethoxy}-aniline, washed free of acid with water and then washed with dilute aqueous sodium hydroxide to remove any unreacted 1-ethylamino-4-hydroxyanthraquinone. The dye is then washed with water to remove any sodium hydroxide present. It colors cellulose acetate greenish-blue shades.

Similarly following either the procedures of Examples 1 and 2 or of Examples 3 and 4, 1-β-methoxyethylamino-4-p-[β - (β-ethoxyethoxy)-ethoxy]-anilino anthraquinone (M. P. 110°–112° C.), 1-β - methoxyethylamino - 4-o - [β-(β-hydroxyethoxy)-ethoxy]-anilino anthraquinone, 1-β-hydroxyethylamino - 4-<p-{β-[β-(β-hydroxyethoxy)-ethoxy] - ethoxy} - anilino> - anthraquinone, 1-β-hydroxyethylamino-4-{p-[β-(β-hydroxyethoxy) - ethoxy]-anilino}- anthraquinone, 1-n-propylamino-4-<p-{β-[β-(β-hydroxyethoxy)-ethoxy]-ethoxy}-anilino> - anthraquinone, 1-isopropylamino-4-<p-{β-[β-(β-hydroxyethoxy)-ethoxy]-ethoxy} - anilino> - anthraquinone, 1-β,γ-dihydroxypropylamino-4-<p-{β-[β-(β-hydroxyethoxy)-ethoxy]-ethoxy}- anilino>-anthraquinone, 1-β,γ-dihydroxypropylamino-4-<p-{β-[β-(β-ethoxyethoxy) - ethoxy]-ethoxy} - anilino> anthraquinone, 1 - β,γ - dihydroxypropylamino-4 -{o-[β-(β-hydroxyethoxy)-ethoxy] - anilino} - anthraquinone, 1 - β,γ - dihydroxypropylamino-4 - <p-{γ-[γ-(γ-hydroxypropoxy)-propoxy] - propoxy}-anilino>-anthraquinone, 1-n-butylamino-4-<p-{β-[β-(β-hydroxyethoxy)-ethoxy]-ethoxy}-anilino> - anthraquinone and 1-n-butylamino-4-{p-[β-(β-hydroxyethoxy)-ethoxy]-anilino}-anthraquinone can be prepared.

Likewise in accordance with our invention 1-methylamino-4-{o-methoxy - p-[β-(β-hydroxyethoxy) - ethoxy] - anilino} - anthraquinone, 1-ethylamino-4-{p-hydroxy-o - [β-(β-hydroxyethoxy] - anilino} - anthraquinone, 1 - ethylamino-4-{p-[β-(β-hydroxypropoxy) - propoxy]-anilino}-anthraquinone, 1-β-hydroxyethylamino-4-{p-[β-(β-methoxyethoxy)-ethoxy] - anilino}-anthraquinone, 1-β-hydroxyethylamino-4-<o-trifluoromethyl-p - {β-[β-(β-hydroxyethoxy)-ethoxy]-ethoxy}-anilino> -anthraquinone, 1-β-hydroxyethylamino-4 - <p - {β - [β - (β - hydroxypropoxy)-propoxy] - propoxy} - anilino>-anthraquinone, 1-isopropylamino-4-{p-[β-(β-hydroxyethoxy)-ethoxy]-anilino}- anthraquinone, 1 -isopropylamino-4 - {o-[β-(β-hydroxyethoxy)-ethoxy] - anilino} - anthraquinone, 1 - isopropylamino-4 - {p-[γ-(γ-hydroxypropoxy)-propoxy] anilino}-anthraquinone and 1-n-propylamino-4-{p-[β-(β-ethoxyethoxy)-ethoxy] - anilino} - anthraquinone can be prepared.

1-(alkyl, alkoxyalkyl, hydroxyalkyl) amino-4-halogen anthraquinone compounds can be prepared by halogenating a 1-(alkyl, alkoxyalkyl, hydroxyalkyl) amino anthraquinone. These latter anthraquinone compounds can be prepared, for example, by reacting 1-chloroanthraquinone in a diluent medium inert under the reaction conditions employed with an alkylamine, alkoxyalkylamine or a hydroxyalkylamine in the presence of cupric acetate. The manner of preparation of these 1-(alkyl, alkoxyalkyl, hydroxyalkyl) amino anthraquinone compounds will be apparent from the following.

*Preparation of 1-methylaminoanthraquinone*

122 grams of 1-chloroanthraquinone, 500 grams of pyridine, 148 grams of a 25% solution of methylamine in water and 1 gram of cupric acetate are heated together in a shaking autoclave at 130° C. for six hours. The autoclave is then cooled to room temperature and its contents poured into two liters of water. The reaction mixture is filtered, washed with water and dried. 1-methylaminoanthraquinone melting at 167° is obtained with a yield of about 95%.

Similarly, the following have been prepared:

1-isopropylamino anthraquinone (M. P. 187°–189° C.)

1-β-methoxyethylamino anthraquinone (M. P. 163°)

1-β,γ-dihydroxypropylamino anthraquinone (M. P. 216–218° C.)

1-β-hydroxyethylamino anthraquinone (M. P. 164–165° C.) and 1-ethylamino anthraquinone (M. P. 123°–124° C.)

The manner of preparation of the 1-(alkyl, alkoxyalkyl, hydroxyalkyl) amino-4-halogen anthraquinone compounds, is illustrated hereinafter.

*Preparation of 1-methylamino-4-bromoanthraquinone*

47.4 grams of 1-methylamino anthraquinone are dissolved in 500 cc. of pyridine and the resulting reaction mixture is heated on a water bath to 60° C. with stirring. At this temperature there is added to the reaction mixture, which is contained in a suitable reaction flask, 33.2 grams (10% excess) of bromine over a period of 1½ hours. The reaction mixture is then slowly heated to 90–95° C. and kept there for two hours, filtered hot and allowed to cool overnight. Stirring is maintained throughout the period of heating. The cooled reaction mixture is filtered to recover the 1-methylamino-4-bromoanthraquinone which is washed with 100 cc. of pyridine and dried. The product obtained melts at 193°–195° C.

Similarly, β-hydroxyethylamino-4-bromoanthraquinone (M. P. 170° C.), 1-β,γ-di-hydroxypropylamino-4-bromoanthraquinone (M. P. 145° C.), 1-β-methoxyethylamino-4-bromoanthraquinone (M. P. 152° C.), and 1-isopropylamino-4-bromoanthraquinone (M. P. 222° C.) have been prepared.

The aniline derivatives of the following formula:

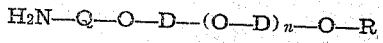
H₂N—Q—O—D—(O—D)ₙ—O—R wherein $n$ represents a positive integer of from 1 to 2, Q represents a phenylene group, D represents an ethylene group, a trimethylene group or a propylene group and R represents a hydrogen atom or an alkyl group of from 1 to 2 carbon atoms can be prepared by condensing a chloronitrobenzene derivative of the following formula:

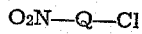
O₂N—Q—Cl wherein Q represents a phenylene group which may carry substituents such as halogen, an acetamino group, a methyl group, a hydroxyl group, an alkoxy group, a trifluoromethyl group, etc., with a sodium alcoholate of the following formula:

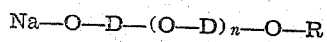
Na—O—D—(O—D)ₙ—O—R wherein D represents an ethylene group, a trimethylene group or a propylene group, $n$ represents a positive integer of from 1 to 2, and R represents hydrogen or an alkyl group containing from 1 to 2 carbon atoms, and then reducing the resulting nitro compound with hydrogen, in the presence of a nickel catalyst, especially of the Raney type, in methanol, at from 80° to 100° C. in an autoclave under a hydrogen pressure of 400 to 1800 pounds per square inch. The initial condensation of the chloronitro compound and the sodium alcoholate is advantageously carried out at 90° to 100° C. for about 20 hours. The sodium alcoholates can be prepared by adding sodium to the alcohols of the formula:

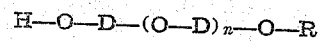
H—O—D—(O—D)ₙ—O—R wherein D represents an ethylene group, a trimethylene group or a propylene group, $n$ represents a positive integer of from 1 to 2, and R represents hydrogen or an alkyl group of from 1 to 2 carbon atoms. Many of these alcohols are very well known substances and readily available on the market, e. g. diethylene glycol and triethylene glycol and the monomethyl and monoethyl ethers of these glycols. Dipropylene glycol is also available on the market. Tripropylene glycol can be prepared by reacting 10 moles of dipropylene glycol with one mole of sodium and condensing the resulting mixture with one mole of propylene chlorohydrin (CH₃CHOHCH₂Cl). Di-trimethylene glycol can be prepared by reacting 10 moles of trimethylene glycol with one mole of sodium and condensing the resulting mixture with trimethylene chlorohydrin. Tri-trimethylene glycol can be prepared by reacting 10 moles of di-trimethylene glycol with one mole of sodium and condensing the resulting mixture with one mole of trimethylene chlorohydrin. The monomethyl and monoethyl ethers of di- and tri-propylene glycol and of di-trimethylene glycol and tri-trimethylene glycol can be prepared by reacting 5 to 10 moles of the glycol with sodium and condensing the resulting mixture with methyl iodide or ethyl iodide.

The anthraquinone dyes of our invention are especially useful for the coloration of organic derivatives of cellulose which include the hydrolyzed, as well as the unhydrolyzed, cellulose carboxylic esters, such as cellulose acetate, cellulose propionate and cellulose butyrate, and the hydrolyzed, as well as the unhydrolyzed, mixed carboxylic esters of cellulose, such as cellulose acetate-propionate and cellulose acetate-butyrate, and the cellulose ethers, such as methyl cellulose, ethyl cellulose and benzyl cellulose. Our new dyes are also useful for the coloration of cellulose ester and cellulose ether lacquers, as well as lacquers made from polyvinyl compounds. Our new dyes can be used to color nylons and textiles prepared therefrom.

The anthraquinone dyes of our invention can be applied to the coloration of fabrics made of or containing organic derivatives of cellulose, such as cellulose acetate rayon, by the known dyeing or printing methods. In accordance with the known dispersion method of dyeing, the anthraquinone dyes are first ground to a fine powder, intimately mixed with a suitable dispersing or solubilizing agent, following which the resulting mixture is added to water or a dilute solution of soap in water to form an aqueous dye bath. The textile materials are then immersed in such a dye bath in accordance with known procedures. Suitable dispersing or solubilizing agents include soap, sulforicinoleic acid, the alkali metal salts of sulforicinoleic acid, sulfonated oleic, stearic or palmitic acid or salts thereof, such as the sodium or ammonium salts.

In accordance with the recommendations of Chemical Abstracts, the term propylene is intended to mean the group having the following formula:

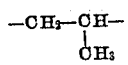

and the term trimethylene is intended to mean the group having the following formula:

$$-CH_2-CH_2-CH_2-$$

We claim:

1. The anthraquinone dye compounds having the general formula:

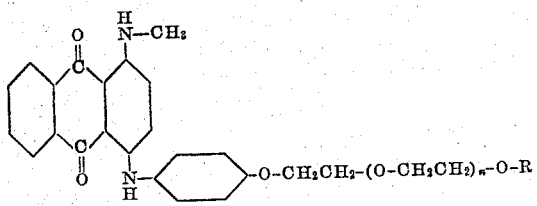

wherein $n$ represents a whole positive integer of from 1 to 2 and R represents an alkyl hydrocarbon group containing from 1 to 2 carbon atoms.

2. The anthraquinone dye compound having the formula:

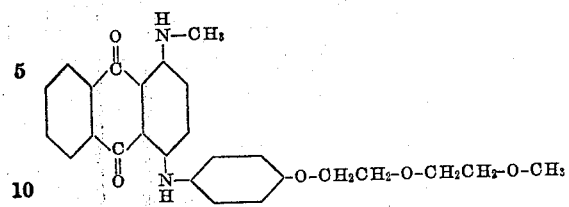

HARRY W. COOVER.
JOSEPH B. DICKEY.
EDMUND B. TOWNE.

REFERENCES CITED

The following references are of record in the file of this patent:

UNITED STATES PATENTS

| Number | Name | Date |
|---|---|---|
| 2,210,517 | Wilder | Aug. 6, 1940 |
| 2,242,760 | Schoeller | May 20, 1941 |
| 2,326,047 | McNally et al. | Aug. 3, 1943 |
| 2,338,908 | Dickey et al. | Jan. 11, 1944 |
| 2,353,108 | Wuertz et al. | July 4, 1944 |
| 2,357,176 | Dickey | Aug. 29, 1944 |